United States Patent [19]
Phillips, III

[11] Patent Number: 6,082,011
[45] Date of Patent: Jul. 4, 2000

[54] LASER PLANE VEHICLE ALIGNMENT SYSTEM

[76] Inventor: Robert B. Phillips, III, 17 N. Cross Rd., Staatsburg, N.Y. 12580

[21] Appl. No.: 08/980,889

[22] Filed: Dec. 1, 1997

[51] Int. Cl.[7] ................................................ G01B 5/255
[52] U.S. Cl. .................................... 33/203.15; 33/203.16; 33/288
[58] Field of Search ................................ 33/203, 203.15, 33/203.16, 203.17, 286, 288, DIG. 21, 227, 228, 285; 356/155, 375

[56] References Cited

U.S. PATENT DOCUMENTS

| | | | |
|---|---|---|---|
| D. 278,983 | 5/1985 | Woodruff | D10/46 |
| 2,378,631 | 6/1945 | Holmes | 33/203.12 |
| 2,410,339 | 10/1946 | Creagmile | 356/155 |
| 2,470,090 | 5/1949 | Carrigan et al. | 356/155 |
| 2,496,324 | 2/1950 | Wilson | 356/155 |
| 2,641,957 | 6/1953 | Vandermer | 356/155 |
| 2,656,762 | 10/1953 | Carr | 356/155 |
| 2,667,805 | 2/1954 | Carr | 356/155 |
| 2,700,319 | 1/1955 | Carr | 356/155 |
| 3,288,020 | 11/1966 | Lill | 356/155 |
| 3,363,504 | 1/1968 | Lill | 356/155 |
| 3,501,240 | 3/1970 | Haynes | 356/155 |
| 3,756,724 | 9/1973 | Schirmer | 356/155 |
| 3,951,551 | 4/1976 | Macpherson | 356/155 |
| 3,962,796 | 6/1976 | Johnston | 33/288 |
| 4,102,227 | 7/1978 | Simko | 83/881 |
| 4,142,299 | 3/1979 | Alsina | 33/288 |
| 4,157,618 | 6/1979 | Davis | 33/337 |
| 4,249,824 | 2/1981 | Wiederrich et al. | 356/155 |
| 4,330,945 | 5/1982 | Eck | 33/288 |
| 4,429,467 | 2/1984 | Murata et al. | 33/203 |
| 4,441,259 | 4/1984 | Leitermann et al. | 33/288 |
| 4,466,196 | 8/1984 | Woodruff | 33/288 |
| 4,578,870 | 4/1986 | Cooke | 33/288 |
| 4,598,481 | 7/1986 | Donahue | 33/288 |
| 4,767,208 | 8/1988 | Cain et al. | 356/155 |
| 4,827,623 | 5/1989 | Goodell | 33/288 |
| 4,844,609 | 7/1989 | Floyd et al. | 356/154 |
| 5,048,954 | 9/1991 | Madey et al. | 356/155 |
| 5,274,433 | 12/1993 | Madey et al. | 356/155 |
| 5,367,779 | 11/1994 | Lee | 33/290 |
| 5,402,226 | 3/1995 | Matthews et al. | 356/141.3 |
| 5,515,613 | 5/1996 | Hinson | 33/288 |
| 5,532,816 | 7/1996 | Spann et al. | 356/139.09 |
| 5,600,893 | 2/1997 | Phillips | 33/203.18 |

OTHER PUBLICATIONS

"Chassis Engineering: Chassis Design, Building & Tuning for High Performance Handling", by Herb Adams, HP Books, (1993), Chapter 16, pp. 110–125.

"Performance Handling," by Don Alexander, Motorbooks International Publishers & Wholesalers, (1991), Chapter 10, pp. 102–113.

"Automotive Mechanics," (10th Ed.) by William H. Crouse and Donald L. Anglin, McGraw–Hill (1993), Chapter 50, pp. 675–690.

Instruction Manual for "Laser String" by Advanced Racing Technologies Inc., (Dec. 1996), pp. 1–3.

Instruction Manual for "Laser Toe Gauge," by Advanced Racing Technologies Inc., (Jan. 1995), pp. 1–5.

Instruction Manual for "Laser Bump Steer Camber Profile & Straight Line Laser Gauge," by Advanced Racing Technologies Inc., (Jul. 1994), pp. 1–4.

Instruction Manual for "Pro K–Laser Toe Gauge," by Advanced Racing Technologies Inc., (Jul. 1994), pp. 1–4.

Primary Examiner—Diego Gutierrez
Assistant Examiner—R A Smith
Attorney, Agent, or Firm—Steven G. Lisa

[57] ABSTRACT

An alignment system is comprised of a lower base plate coupled to an upper slide plate. The plates are coupled together by a sliding mechanism configured to allow the upper plate to slide in two dimensions parallel to the lower plate. A mounting surface is formed in the upper plate proximate a first outer edge, the mounting surface being inclined at a angle below the horizontal relative to the outer edge of the upper plate. A vertical plane of light is generated and is visible when the light impinges upon an object. An alignment bar is coupled to the outer edge of the upper slide plate in an orientation parallel to the plane of light. When a support surface is level, the upper plate is inclined at an angle and gravity causes the upper plate to slide relative to the lower plate until the alignment bar rests against a component to be measured.

25 Claims, 6 Drawing Sheets

LASER PLANE VEHICLE ALIGNMENT SYSTEM

FIELD OF INVENTION

This invention relates to vehicle alignment systems and methods, and more specifically, to alignment systems and methods that employ a laser mounted to a movable fixture to generate a reference plane for making alignment measurements.

BACKGROUND OF INVENTION

Correct wheel and chassis alignment is critical to a vehicle's handling performance, as it allows the tire contact patches to work effectively through all phases of suspension motion. Each vehicle, and indeed each individual driver, will have a preferred alignment set-up depending on the application and conditions. Vehicle wheel alignment is particularly important in racing applications, where small changes in alignment can have a dramatic handling impact on highly responsive race cars. However proper wheel alignment is important for all vehicles, such as racecars, trucks, cars, airplanes, trains, motorcycles, go-karts, mopeds. The present invention can also be used for aligning the treads on bulldozers, tanks, and snowmobiles and can be used for aligning a variety of other components.

Most commercial automobile and truck service stations, and also many well-funded race shops, used sophisticated wheel and vehicle alignment systems. However, those systems are extremely expensive, and are not readily obtainable by the average race team or to the do-it-yourself mechanic. Moreover, because those sophisticated alignment systems are not portable, even well-funded race teams must find an alternative for changing and measuring vehicle alignment at the racetrack.

A standard portable method for setting alignment is commonly referred to as the "string method." In accordance with the string method, the vehicle to be aligned is placed on jack stands to allow easy access to its underside on a known flat and true surface. First, the centerline of the vehicle must be determined. To determine the centerline, two identical points called pick-up points are located on both sides of the rear and front of the vehicle. For example, identical bolts on the suspension system can be used. Then a plumb bob is dropped from each of the four inner suspension pick-up points and points are then marked on floor or surface under the plumb bob. The mid-way point between the two front marks and two rear points are measured and marked on the floor. The two midway points are then connected with a string, or centerstring, that extends past the chassis to establish the centerline of the vehicle. Two points are then scribed or marked on the underbody of the vehicle to provide a future reference of the vehicle's center line. To determine the points to be scribed, a plumb bob is dropped from a convenient point on the chassis so that the plumb bob is aligned with the centerstring. The vehicle is then lowered to the floor. Next, two jack-stands, having a string strung taut between them, are set up on both sides of the vehicle. Each set of jack stands and string are set to within approximately six inches of the wheel rims and at approximately the same height as the axle. The distance between each string and the center-line is measured at both the front and rear of the vehicle. The jack stands are then adjusted until the front and rear measurements are equal. When this is accomplished, the strings on the outside of the vehicle are set parallel to the centerline of the vehicle, and provide a reference line for making alignment measurements.

To determine front or rear "toe" (also called "tracking" in some countries), using the string method, a machinist's ruler is used to measure the distance from the string to the front edge of the wheel rim. Next, the distance from the string to the rear edge of the wheel is measured. If the rear edge measurement is smaller than the front edge measurement, toe-in is present. If the rear edge measurement is larger, toe-out is present. The toe is then adjusted and measurements retaken until the desired results are obtained.

In some instances, the race mechanic will mark at least two points closer to each side of the vehicle that define a line that parallels the centerline of the vehicle. With many stock cars, the side frame rail can be used as that line. By using these two points on the vehicle, the mechanic does not have to crawl under the car to set up the centerline. Instead he merely has to determine that the strings on both sides of the vehicle are parallel to these two points on the vehicle.

For cars with an independent front and rear suspension, the toe of both the front and rear wheels can be determined. Whereas only the front wheels of a car with a live axle can be adjusted for toe and the rear wheels normally should parallel the centerline of the vehicle. For cars with a live rear axle, a similar method may be used to determine whether the centerline of the axle is properly aligned with the centerline of the car. Since the rear wheels on a live rear axle should parallel the vehicle centerline, measuring the "toe" of each tire will determine whether the centerline of the rear axle is properly aligned with the centerline of the vehicle. In this case, the "toe" measurements on both rear wheels should equal zero which shows that the centerline of the live rear axle is perpendicular to the centerline of the car.

Although the string method has long been the standard for obtaining toe measurements in the field, it has several drawbacks, especially for use in high-speed racing applications. First the string method is not very accurate or repeatable. In racing applications, wheel alignment must be correct and repeatable, and is often changed several times in a single weekend. To make accurate alignment measurements, it is necessary to roll the vehicle forwards and backwards several feet to set and load the suspension before taking the measurements. In the string method, the strings are carefully set with the car in a specific and stationary position relative to the centerline. Thus, any subsequent movement of the vehicle will require that the strings be reset. If the strings are not reset, or if the vehicle is not rolled forward and backward between alignment adjustments, inaccuracies in measurement and alignment will result. Second, the time necessary to set up the strings in the string method is significant. Thus, it is not practical to "re-string" the car for alignment checks between short test or qualifying sessions. Third, the string method is difficult and time consuming for two mechanics to perform, and is even more difficult for someone acting alone. Each of these drawbacks makes the string method useful only as a last resort. Thus, the need has long existed to develop alternatives to the string method of vehicle alignment.

Several alternative wheel alignment systems make use of visible lasers or beams to replace the strings that are used in the string method. For example, U.S. Pat. No. 4,466,196 to Woodruff uses a laser and a sensor module and that are both secured to their respective spindles of the vehicle's wheels by means of a magnet. The sensor module and the laser housing each have the ability to rotate. However, mounting and setting the sensor modules and laser housing can be time consuming, and can be difficult as well depending on the configuration of the wheel rim or tire spindle. In addition, if the laser sensor and laser housing is not secured properly or consistently, erroneous measurements can result. Lastly, because the laser housing and module are constructed as a single piece, the laser can only be used for the single purpose of vehicle wheel alignment, and cannot be easily adapted or removed for other purposes.

U.S. Pat, No. 4,578,870 to Cooke has the capability of projecting a laser plane by using a switching mechanism and a cylindrical lens that changes the beam of light typically emitted by a laser into a plane of light. The system is primarily designed for the inspection of vehicle frame and body alignment, and is preferably employed with a vehicle frame and body system, such as mounting carrier bars to the body of the vehicle for which to attach the laser generator and respective target, or possibly some other type of external framework assembly designed for the purpose of mounting the laser generator and target. The '870 patent incorporates the use of two elongate carriers bars that are mounted to the body of the vehicle orthogonal to the vehicle's center line. The laser beam plane generator is mounted on one of the bars, and the target is mounted on the other bar. Because the device can project a vertical laser plane that is projected on all surfaces within the plane, it is not necessary to rotate the laser beam plane generator to sight in the individual targets. It therefore creates a plane orthogonal to its elongate mounting bars of the vehicle frame and body alignment system. However, because of its design, it still requires some time to set up. The set up time will vary depending upon what type of vehicle and alignment system is used with the beam/plane projection laser. At the very least, the alignment system must be mounted on the vehicle (such as the two carrier bars), or an external system must be set up. The beam/plane projector and respective targets must then be mounted to the alignment system and adjusted. In addition, because it is designed to be used with the elongated carrier bars, it is complicated and appears to require considerable set up.

There are other patents, such as U.S. Pat. No. 4,598,481 to Donahue, that incorporate the use of laser generated planes for vehicle alignment purposes. However, the laser generated planes typically require the use of an elaborate frame structure for which to mount them and their corresponding targets, therefore restricting their portability and use in other measurement type applications. Numerous other vehicle alignment systems exist that use a visible laser to provide a reference line for making measurements. See, for example, U.S. Pat. Nos. 5,274,433 and 5,048,954 to Madney et al., U.S. Pat. No. 4,330,945 to Eck, and U.S. Pat. No. 3,962,796 to Johnston.

The applicant himself also has made and sold several laser-based vehicle alignment and measurement devices, including: U.S. Pat. No. 5,600,893 to the applicant for "A Process and System for Measuring Alignment of Automotive Vehicle Suspension" that is used to measure bump-steer, toe, and camber; an updated version a laser toe angle gauge to be used on go-karts, snowmobiles ATV's etc. . . . ; and a laser system used to accurately measure race car chassis'to help determine if a race car is within the required specifications.

The toe and camber measuring device of the applicant's '893 patent consists of a pivotal laser light source, a reflector, and gridded target that are positioned in a straight plane that extends from the wheel hub axis. The pivotal light source is positioned so that the projected laser beam is directed at the center point of a magnetically mounted reflector. The reflector is located on the flat surface of the rotor brake and is orthogonal to the wheel hub axis. The laser beam reflects off the reflector to the gridded target area located at least sixty inches behind the pivotal A light source.

A mark is made on the target at the point where the laser beam strikes it. this initial mark is typically done with the car raised to a height equal to the radius of the tires to be used with the vehicle. The position of the suspension system is then changed by either raising or lowering the suspension in one inch increments. At each increment a mark is made on the target that corresponds to the beam spot. The change in toe is represented by any horizontal movement of the reflected light beam. The measured distance between the marks correlates to a change in the position of the reflector as the vehicle is raised and lowered. This measured distance is then use to determine the amount of toe travel by use of a conversion chart. Camber angle change is determined in the same way, only the distance measured will be on a vertical plane. The camber angle change is then derived using another conversion chart. Using this procedure can produce results that are accurate to one millionth of an inch. The procedure, however, requires the use of only laser line technology, a pivotal mounted light source, a reflector, and a griddled target for which to measure distance.

The Laser Toe Gauge for go-karts operates on the same premise as above by using a laser beam, reflector, and target. In addition there is an angle indicator incorporated into the laser head. Instead of a single mirror or reflector, it uses a rail that is mounted to one of the front tires and extends longitudinally towards the front of the kart with a mirror surface at its end parallel the body of the kart. On the opposite front tire, the laser rail is mounted and extends longitudinally to the front of the kart where the laser head is mounted and parallel to the body of the kart. The laser is turned on and the laser reflection is adjusted with an angle adjustment knob until the reflected beam hits the laser target or scribe line that is mounted on the front of the laser head. The toe angle is then read from the angle indicator.

The axle and frame laser alignment system also works in much the same way. It incorporates the use of two separate mirrors and a laser rail housing with a slidable laser head. The two mirrors are mounted at selected points on one side of the vehicle. To measure axle alignment, one mirror would be positioned on the frame of the vehicle and the other would be mounted parallel to the first mirror on the end of the vehicle axle. The rail housing is positioned directly in front of the mounted mirrors. The laser head is then slid into position directly in front the mirror that is mounted to the vehicle frame so that the beam reflects into the center scribe line on the front of the laser head. The laser head is then moved along the linear rail to the mirror mounted on the axle of the vehicle. The rear axle is then adjusted until the beam reflects onto center scribe line on the front of the laser head.

The need still exists, however, for a simple alignment measuring system and method that is easy to set up, accurate, repeatable and universal in application across different types of vehicles.

SUMMARY OF THE INVENTION

It is an object of the invention to provide an improved system and method for vehicle alignment that is easier to use than the common string methods.

It is another object of the invention to provide a portable means for quickly and easily creating a vertical plane of light.

It is another object of the invention to means for quickly and easily establishing a vertical reference plane that parallels a selected surface.

It is an object of the invention to provide a way for making consistent repeatable vehicle alignment measurements.

It is another object of the invention to provide a method to correct for manufacturing defects by allowing factory prealignment of a surface of a device parallel to a plane of light generated by the device.

It is another object of the invention to provide a system and method for checking vehicle alignment that can be used on virtually any make or model of vehicle.

It is another object of the invention to provide a self-aligning system and method for checking suspension or vehicle alignment settings.

It is another object of the invention to provide a method for easily performing rear axle alignment by a single mechanic.

It is yet another object of the invention to eliminate the necessity of determining whether a string, as used in common string methods, is accurately aligned or parallel to the centerline of a vehicle.

It is an object of the invention to provide a laser light source that is portable, bi-directional and capable of being used on either side of the vehicle being aligned and having the ability of directing its plane of light to either the front or rear of the vehicle.

It is an object of this invention to have an easily removable laser head that can be used for other alignment or measuring purposes.

The above and other objects are achieved by a method of checking alignment of a component of a vehicle, such as the wheels or rear axle of a vehicle, relative to a reference, such as the vehicle center line. A light source is mounted outboard of a first outer edge of an upper slide plate and is operated to generate a plane of light. The light source is preferably a battery powered laser light source that generates a plane of light that is visible over a wide vertical range when the light impinges upon an object. The light source is mounted to the upper slide plate so that its plane of light is generated in a vertical orientation when the upper slide plate is tilted down from horizontal at a slight, predefined, angle towards the component to be aligned. In its preferred form, the plane of light will be in a vertical orientation when the plates are tilted downwards toward the vehicle at angle of about seven degrees below horizontal. A slide mechanism is mounted between the lower plate and upper plate, and supports the upper plate in a manner that allows freedom of movement in the two dimensions parallel to the lower slide plate. Preferably, the support plates are configured in a roughly triangular shape, and three support legs are used with one located proximate each of the points of the triangle. In accordance with the method, the support plates are positioned so that the edge holding the light source is located roughly parallel to and slight distance away from the object to be measured, while the opposing point of the triangular plates is located farthest away from the object to be measured. The support leg located proximate the opposing point is adjusted to raise the opposing point to achieve the desired tilt in the upper and lower plates so that the plane of light will be in a vertical orientation. In its preferred form, a level indicator is included on the light source to indicate when the preset inclination has been achieved. The incline of the upper and lower plates will cause the upper plate to slide relative to the lower plate towards and contact the object to be aligned, thereby self-aligning with the object. An elongated alignment bar may be attached to the upper plate to allow the upper plate to more readily conform to the relative alignment of the component to be measured. Once the upper plate and its alignment bar comes to rest on the component to be aligned, the vertical plane of light can be used to make the desired measurements relative to a reference line, such the centerline of the vehicle.

The above and other objects are also achieved by an alignment system for measuring the alignment of a component of a vehicle. The system includes a lower base plate and an upper laser slide plate oriented parallel to the lower plate. A sliding mechanism is coupled between the lower and upper plates and is configured to allow the upper plate to slide in two dimensions parallel to the lower plate. A light source mounting surface is formed in the upper plate and is inclined at an angle below the horizontal beginning at an outer edge of and directed towards the center of the upper plate. A light source is removably coupled to the mounting surface on the upper slide plate, and is operable to generate a vertical plane of light when the light source mounting surface is level in a horizontal orientation. An elongated alignment bar is coupled to the outer edge of the upper slide plate in an orientation parallel to the plane of light generated by the laser light source. A level indicator is coupled to the light source and provides an indication of when the mounting surface is level in a horizontal orientation and, correspondingly, when the plane of light is in a vertical orientation. A level adjuster is coupled to the lower plate and is operable to selectively raise or lower the plates to align the mounting surface level in a horizontal orientation and the plane of light in a vertical orientation. The tilting of the plates causes the upper plate to slide relative to the lower plate in a direction from the center towards the outer edge of the plate until the alignment bar rests against and assumes the relative alignment of the component to be measured. The light source generates a vertical plane of light that extends over an extended vertical range and parallel to the alignment of the component to be measured. In its preferred form, the light source is a battery powered laser source that generates a plane of light that is visible to the human eye when the light impinges upon an object.

The above and other objects are achieved by a modified form of the invention in which the light source can be removed from the light source mounting surface and operated to provide a visible alignment plane for other purposes, such as aligning graphics, checking scale levels, etc.

The above and other objects are achieved by a modified form of the invention in which a slide-limit system is employed to limit the distance that the upper plate can travel relative to the lower plate. The inventive slide-limit system comprises at least one hole (and preferably two) formed in the body of a first slide plate. The hole(s) is/are formed with a diameter that is equal in diameter of the desired limit of travel. A cooperating pin is mounted on the opposing plate and protrudes though the hole formed in the first plate. The circular hole in the first plate, as stopped by the pin of the opposing plate, limits the distance in two dimensions over which the first plate travels relative to the opposing plate. In its preferred form, the limit holes are formed in the top plate with the pins mounted to the lower plate.

The above and other objects are also achieved by an alignment system for measuring the toe in or toe out of a vehicle. The alignment system comprises a lower base plate and an upper laser slide plate oriented parallel to the lower plate. A plurality of supports are coupled to the lower base plate to support the plate above a ground surface. A sliding mechanism is coupled between the lower and upper plates and is configured to allow the upper plate to slide in two dimensions parallel to the lower plate. In its preferred form, the sliding mechanism coupled between the lower and upper plates comprises low friction bearings that allow the force of gravity to cause the upper plate to slide relative to the lower plate when the angle of the plates exceeds a horizontal orientation. A laser light source is configured to generate a plane of light. A laser fixture including a receiver is shaped to hold the laser light source so that the source generates a vertical plane of light when the laser fixture is aligned in a horizontal orientation. A laser fixture mounting surface is formed in the upper plate at a position inboard of a first edge. The mounting surface is inclined at a slight downward angle from the first edge towards the center of the upper plate, and is configured to removably hold the laser fixture. An alignment bar is coupled to the laser fixture in an orientation parallel to the plane of light generated by the laser light source. An angle indicator is coupled to the laser fixture to indicate when the fixture is an horizontal position. An angle adjuster is coupled to at least one of the lower plate supports and is configured to selectively raise or lower the angle of the lower and upper plates to align the laser fixture as indicated by the angle indicator in a horizontal orientation. When the laser fixture is aligned in a horizontal orientation, the upper and lower plates will be inclined a slight angle towards the wheels to measured. As a result, the upper plate will tend to slide relative to the lower plate in a direction towards the first edge until the alignment bar rests against and assumes the relative alignment of the wheel. When the laser light source is turned on, it will generate a plane of light that extends over an extended vertical range and parallels the alignment of the wheel. The vertical plane of light then can be used to make toe or axle alignment measurements relative to the center line or anther reference line of the vehicle.

The preferred embodiments of the inventions are described below in the Figures and Detailed Description. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Detailed Description is not intended to indicate a desire to invoke the special provisions of 35 U.S.C. Section 112, ¶ 6, to define the invention. To the contrary, if the provisions of 35 U.S.C. Section 112, ¶ 6, are sought to be invoked to define the inventions, the claims will specifically state the phrases "means for" or "step for" and a function, without also reciting in such phrases any structure, material or act in support of the function. Even when the claims recite a "means for" or "step for" performing a function, if they also recite any structure, material or acts in support of that means of step, then the intention is not to invoke the provisions of 35 U.S.C. Section 112, ¶ 6. Moreover, even if the provisions of 35 U.S.C. Section 112, ¶ 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

For example, although the word "laser is used to describe the plane of light, any form of light can be used, as long as it generates a relatively thin plane that is visible when it contacts an object. In an alternate form, the plane of light need not be visible to the naked eye. Instead a light in a non-visible spectrum may be used, such as infra-red and an electronic device, such as an electronic photo diode can be used to sense light. Likewise, while the upper and lower plates are shown in their preferred form to be triangular, any shape is equally applicable. Furthermore, the preferred for the sliding mechanism comprises round bearings, any form of bearing, oil, or rails can be substituted. Similarly, any travel limit system or method can be substituted for the holes and cooperating pins. Additionally, while the present invention is described as generating a vertical plane of light, the invention can also generate a plane of light at a variety of angles.

BRIEF DESCRIPTION OF THE DRAWINGS

The preferred embodiment, and characteristics, and benefits of the present invention can be more easily understood from the following description of the preferred embodiments in combination with the accompanying drawings.

DETAILED DESCRIPTION

In describing a preferred embodiment of the present invention, references will be made herein to FIGS. 1–10 of the drawings in which like numerals refer to like features of the invention.

Figure 1:
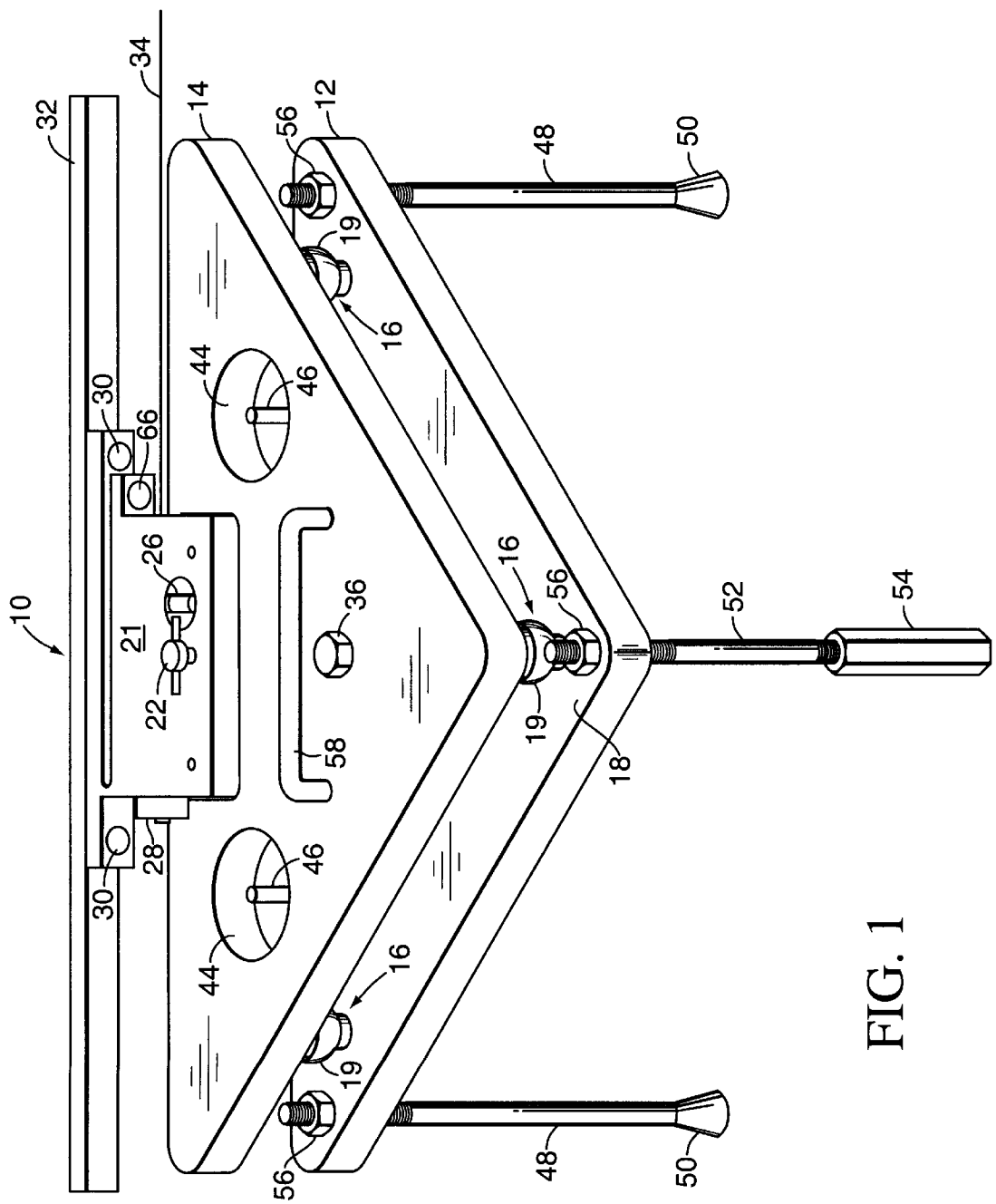
FIG. 1 is a perspective view of a preferred embodiment of the invention.
Figure 2:
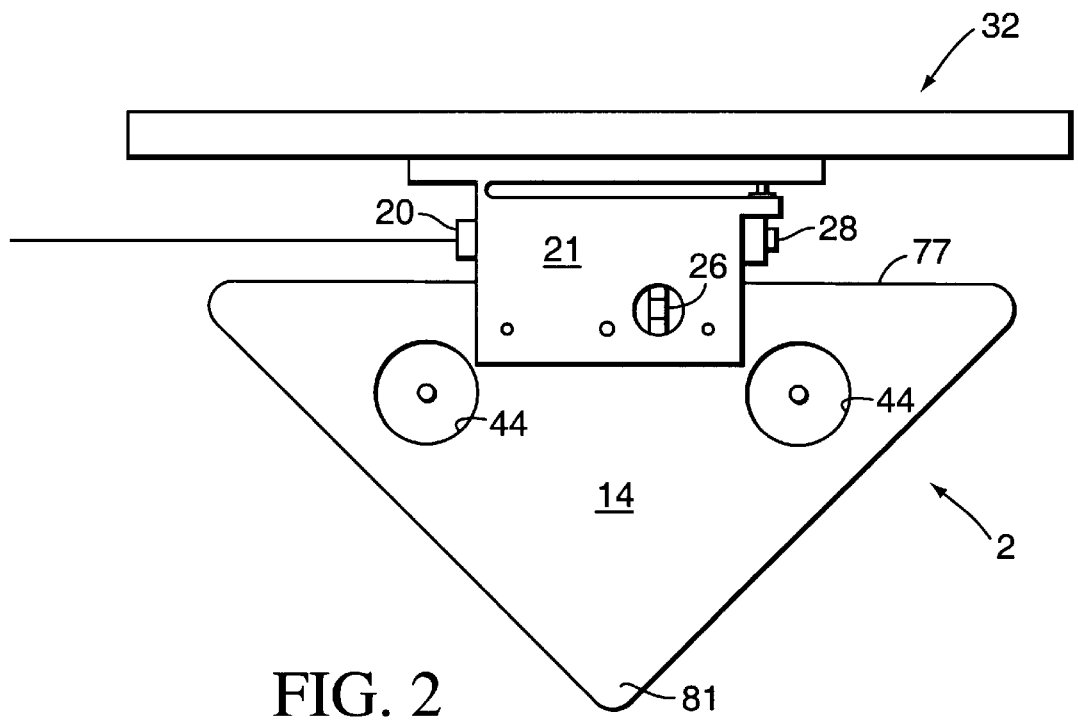
FIG. 2 is a top view of view of a preferred embodiment of the invention.
Figure 3:
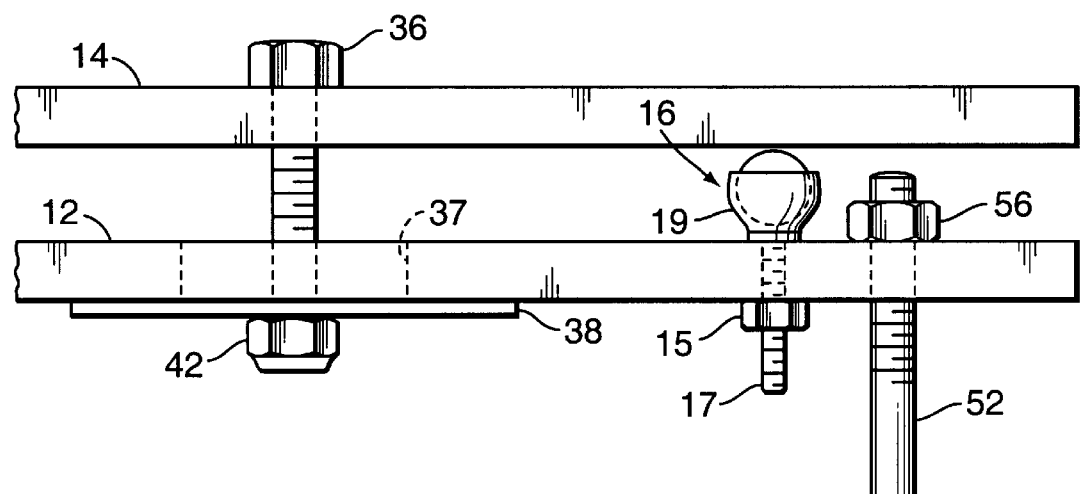
FIG. 3 is a partial side view of the upper slide plate and the lower base plate held together by a retention system.

Referring to FIGS. 1 and 2, the laser plane vehicle alignment device 10 is preferably comprised of a suitably sized lower base plate 12 that is approximately parallel to an upper slide plate 14 that is of a similar size. In their preferred forms, the upper and lower plates are each triangular in shape. A sliding mechanism, comprising in a preferred form three equally sized low friction roller bearings 16, is mounted near the vertices 18 of the lower base plate 12. As shown in FIG. 3, each of roller bearings 16 is preferably mounted to lower base plate 12 by a nut 15 threaded onto bolt end 17 of bearing housing 19. The sliding mechanism allows for two dimensional movement of the upper slide plate 14 parallel to lower stationary base plate 12. A light source 20, preferably a low power 635 nm battery operated laser with a maximum output power of <5 mw @ 670 nm, is located in housing 21 that is removably coupled to the upper slide plate 14 via removable thumb screw 22 and alignment pins 23 (see FIG. 7). The light source 20 is configured to generate a vertical plane of light when the light source mounting surface 24 (see FIG. 7) is level in a horizontal orientation. The light source 20 should generate a plane of light that is visible to the human eye when the light impinges upon an object. Enclosed within the light source housing is angle indicator or vial level 26 to establish when light source 20 is horizontal in orientation and the plane of light generated by light source 20 is in a vertical orientation. On/off switch 28 is located on the side of housing 21 at the end of light source 20. Alignment bar 32 is coupled to housing 21 via two attachment bolts 30 and parallels the plane of light generated by light source 20. Referring to FIG. 3, connector bolt 36 extends vertically downward through upper slide plate 14, opening 37 (see FIG. 9) in lower slide plate 12, slidable retention disc 38, and connector bolt washer 40 and into retention nut 42 for the purpose of holding upper slide plate 14 and lower base plate 12 together in a continuous slidable relationship with each other. Two equally sized holes 44 are formed through the surface of slidable top plate 14. Limit pins 46, mounted on lower base plate 12, extend upward vertically through holes 44 of the top slide plate 14 for the purpose of limiting the travel of the upper slide plate 14. Front adjustable legs 48 are mounted below lower base plate 12 via adjustable mounting nuts 56. Rubber grip pads 50 are provided at the base of the front adjustable legs 48. Rear adjustable support leg 52 is mounted to the lower base plate in a similar fashion. An angle adjuster, such as adjustment nut 54 is threaded onto the base of rear adjustable support leg 52. Adjustment nut 54 is used to selectively adjust the height of the rear adjustable support leg 52 by turning adjustment nut 54 thereby raising or lowering the angle of the lower and upper plates until level 26 indicates that light source 20 is properly situated. Carrying handle 58 is centrally mounted on top of upper slide plate 14 to provide a convenient surface to grip.

It is sufficient to adjust the rear adjustable support leg 52 to level the light source 20 in the one direction to ensure that the resulting plane of light is in a vertical orientation. The front adjustable support legs 48 normally need not be adjusted since it does not matter whether the light plane generated is aimed slightly towards or away from the ground as long as the generated plane of light remains in a vertical orientation.

Figure 4:
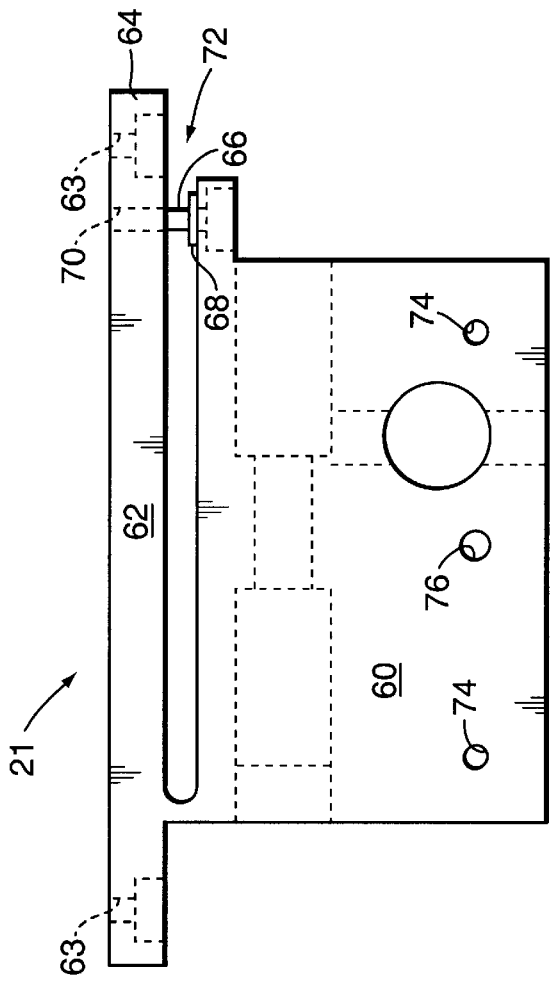
FIG. 4 is a top view of the laser light source and housing.
Figure 6:
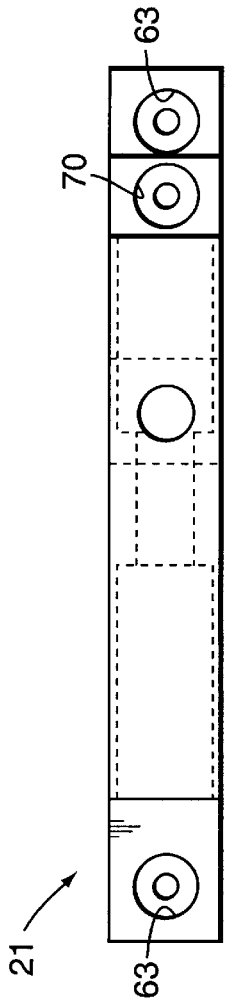
FIG. 6 is side view of the laser light source showing the orientation of the laser beam output.
Figure 5:
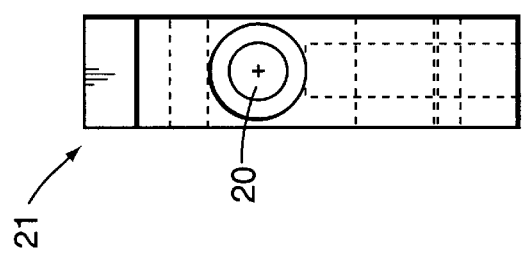
FIG. 5 is a rear side view of the laser light source and housing.

Referring to FIGS. 4, 5, and 6, laser housing 21 preferably includes main body portion 60 and spur 62 having a free end 64. As previously noted, alignment bar 32 is coupled to housing 21 at spur 62 by attachment bolts 30. Openings 63 are provided in housing 21 to accommodate attachment bolts 30. An adjustment system, such as spur bolt 66, spur nut 68, and threaded spur opening 70, is coupled to housing 21 and cooperates to adjust gap 72 between free end 63 and the main body portion 60. The adjustment system is used to correct for various manufacturing tolerances by allowing the manufacturer to adjust gap 72 to factory prealign alignment bar 32 with the plane of light that light source 20 generates.

Figure 7:
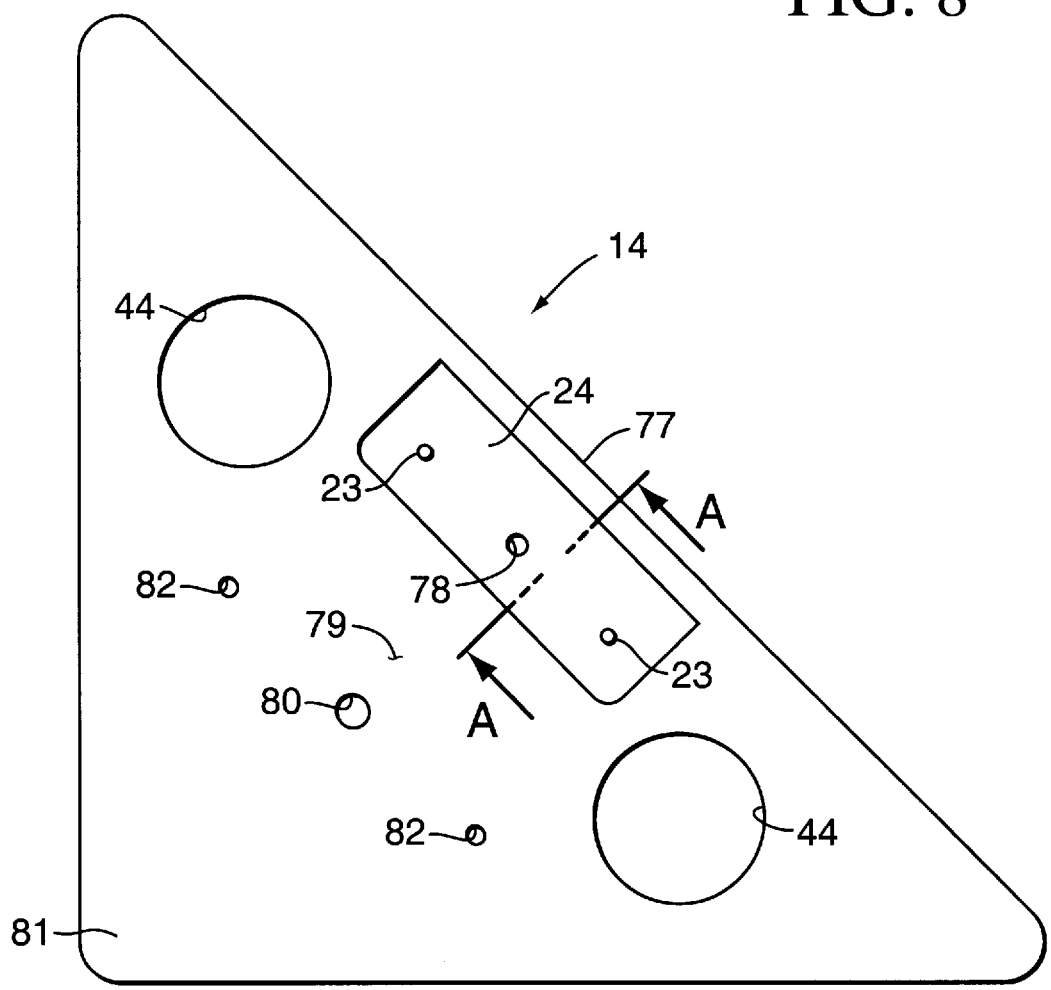
FIG. 7 is a top view of the upper slide plate.

Two alignment holes 74 are drilled through housing 21 which fit over alignment pins 23 (see FIG. 7). Thumb screw opening 76 (see FIG.4) acts in cooperation with thumb screw 22 (FIG. 1) and threaded hole 78 (FIG. 6) to removably attach housing 21 to upper slide plate 14. Because thumb screw opening 76 and alignment holes 74 extend through housing 21, housing 21 can be turned upside down thereby allowing the light source to be pointed in opposite directions, which is useful in making measurements of both front and rear wheels relative to the same reference line located, for example, on the vehicle chassis between the wheels.

Figure 8:
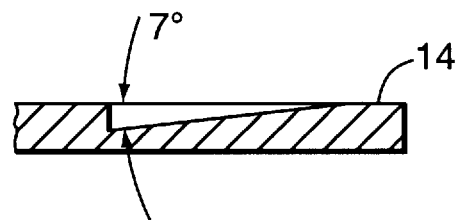
FIG. 8 is a cut away side view taken along lines A—A of FIG. 6 that depicts the seven degree angle built into the slide plates so that when the laser light source is parallel to its mounting surface, the slide plates have a positive seven degree relation to the mounting surface.

Referring to FIGS. 7 and 8, a substantially flat light fixture mounting surface 24 is provided on upper slide plate 14. In a preferred form, light fixture mounting surface 24 is formed in upper slide plate 14 inboard of a first edge or front edge 77, the light fixture mounting surface 24 being inclined at a 7° downward angle from the first edge 77 towards the center 79 of upper plate 14. When light source 20 and housing 21 are leveled by adjusting the rear adjustment nut 54 of rear support leg 52, the end opposite front edge 77, rear corner 81, of is raised at a 7° angle relative to the first edge 77, and gravity causes the upper slide plate (and the alignment bar) to move forward until stopped by the alignment bar contacting and aligning with the surface to be measured. Opening 80 is provided in upper slide plate 14 and sized to accommodate connector bolt 35 whereas openings 82 allow handle 58 to be bolted in place.

Figure 9:
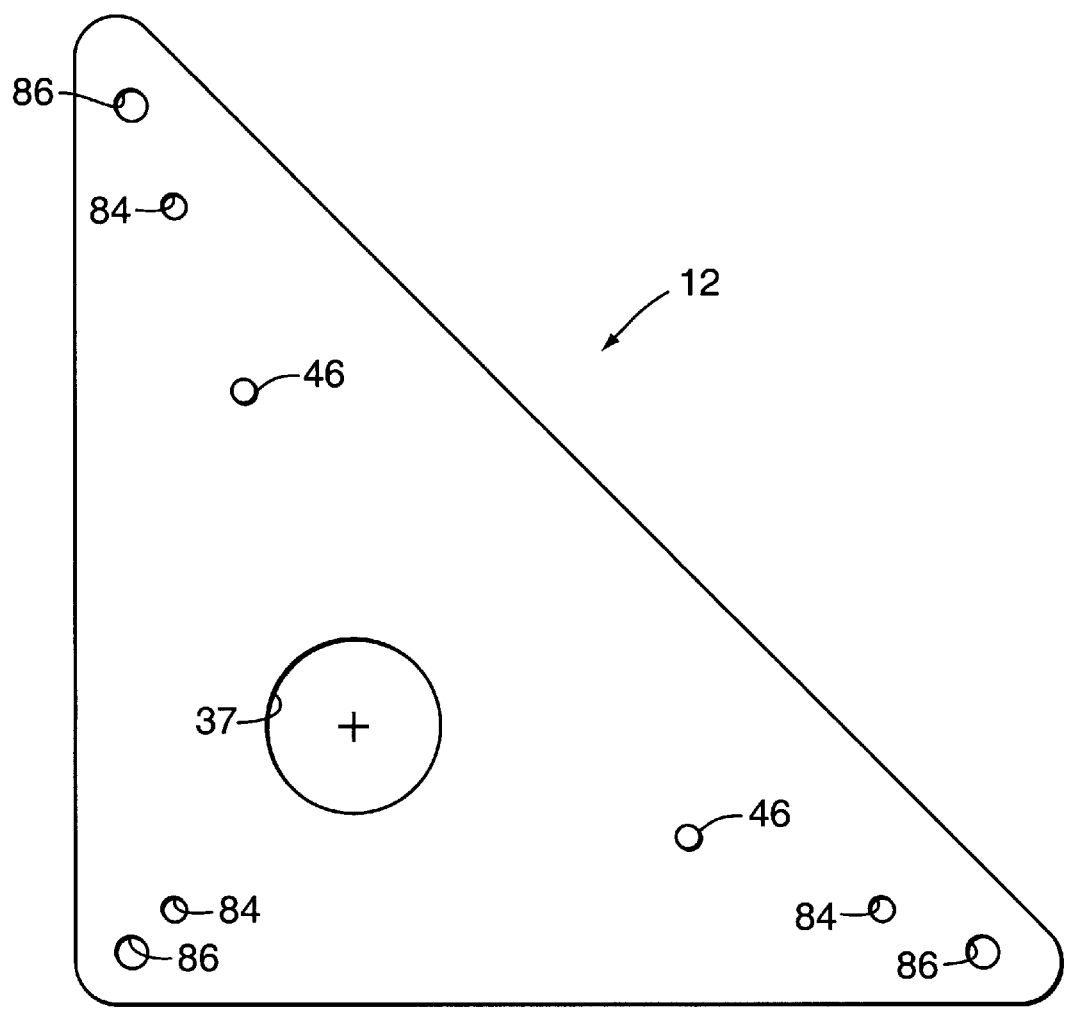
FIG. 9 is a top view of the lower slide plate.

Referring to FIG. 9, an opening 37 is provided in lower base plate 12 and is sized larger than connector bolt 36, yet smaller then retention disc 38 to allow lower base plate 12 and upper slide plate 14 to be coupled together while having a degree of freedom to slide relative to one another. Three openings 84 are provided in lower base plate 12 and sized for mounting roller bearings 16. Three more openings 86 are sized for mounting support legs 48 and 52.

The subject invention can be used to make a number of alignment measurements. More specifically, the subject invention is designed to measure the amount of toe (how much a wheel points in or out from straight ahead) for the front wheels. As noted in the background of the invention similar measurements may be used to determine whether the rear axle of a live rear axle is properly aligned. Additionally, the subject invention may be used to calculate the camber of a wheel.

Figure 10:
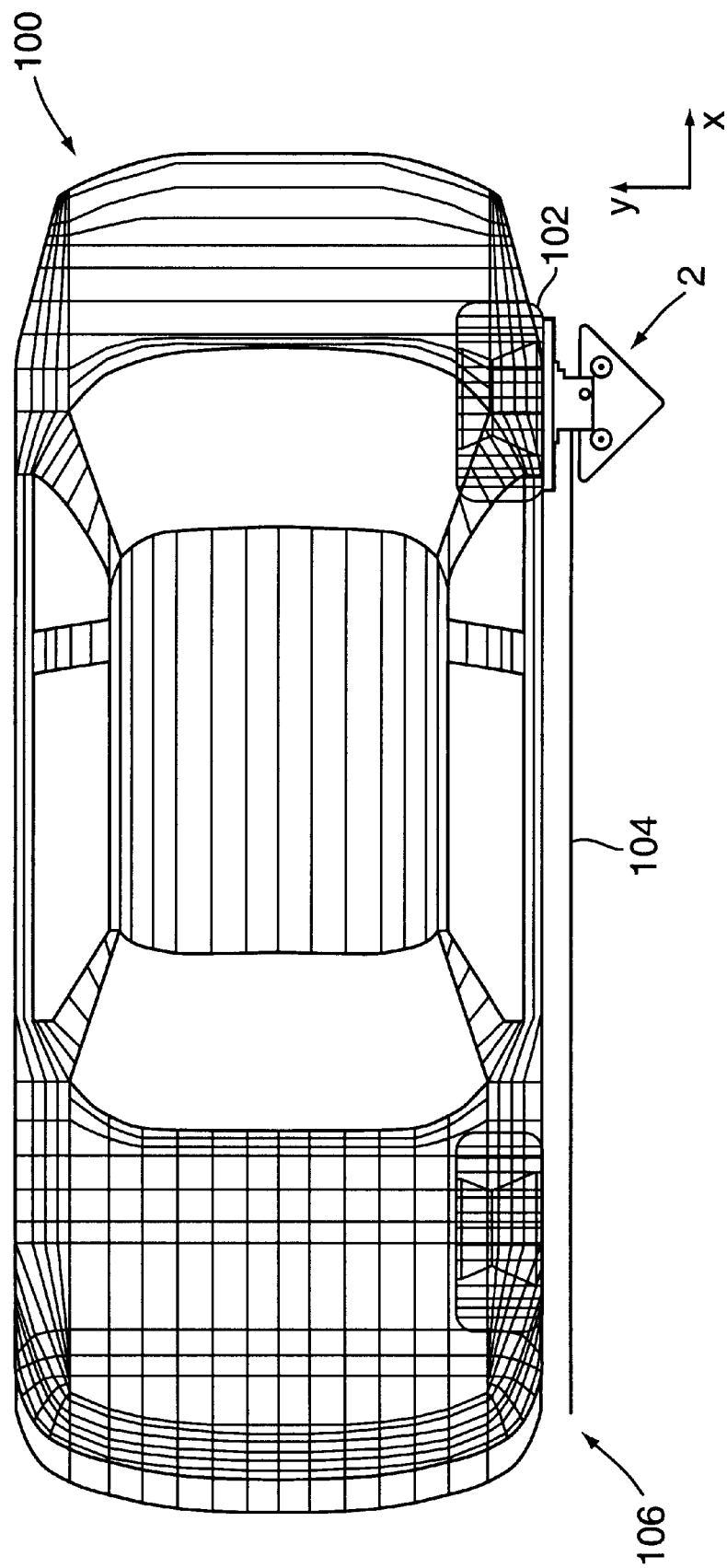
FIG. 10 is a top view of the device in use.

Referring now to FIG. 10, to determine whether the rear axle is properly aligned, (or to measure the amount of toe) using the present invention, a vehicle 100 is parked on a relatively flat surface with the steering wheel centered. The laser plane vehicle alignment device 10 is placed on the relatively flat surface in close proximity to a component to be measured, such as tire 102 of vehicle 100 and orientated so that the alignment bar 32 and front adjustable support legs 48 are close to tire 102 with the rear adjustable support leg 52 being further away. Laser plane vehicle alignment device 10 should be close enough to tire 102 such that alignment bar 32 can self-align and contact the sidewall of tire 102 while limit pins 46 remain within slide plate limit holes 44 without contacting upper slide plate 14.

After vehicle alignment device 2 has been properly positioned, it must be leveled to ensure that the plane of light generated by light source 20 is vertical. To accomplish this, the height of rear adjustment support leg 52 is raised or lowered by turning adjustment nut 54 until level 26 indicates that housing 21 (and therefore light source 20) is properly leveled. Again, it should be noted that normally front adjustable support legs 48 need no adjustment since housing 21 only needs to be level in the one direction for the plane of light generated by light source 20 to be vertical. As discussed previously, since housing 21 is mounted on light source mounting surface 24, when housing 21 is level, upper slide plate 14 is tilted 7° and gravity causes alignment bar 32 to move forward and contact wheel 102.

After vehicle alignment device 2 is properly leveled, light source 20 is turned on via on/off switch 28 and a vertical plane of light 104 is generated that parallels to the tire 102 being measured. When vertical plane of light 104 contacts a surface such as the ground 106 the plane of light is visible to the human eye as a line contacting said surface. In the preferred form, housing 21 that receives light source 20 is mounted outboard of front edge 77 of upper slide plate 14 and alignment bar 32 is mounted outboard of light source 20. (See FIG. 2) In such a configuration, the plane of light 104 generated in a plane between front edge 77 and alignment bar 32. A measuring device, such as a mechanics ruler, is then used to measure the distance between any two points on a line that is parallel to centerline of vehicle 100 and the plane of light. Normally, the mechanic will have predetermined at least two points that are on a line parallel to the centerline of vehicle 102 and are convenient to measure from. The ruler is placed perpendicular to the line defined by the two points and the ruler is read where it intersects the plane of light. If a rear alignment on a live axle vehicle is performed, the rear axle is adjusted until the two measurements are equal.

The vehicle alignment device 2 may be used to determine toe measurements in similar manner. Since toe is normally measured by the amount a wheel points in or out from the straight ahead position, toe can be determined by making the two measurements (described above) at a distance one wheel length from each other and then subtracting one distance from the other. Alternatively if the distance between measurements is some multiple (n) of a wheel length, the toe measurement will be the difference between the two measurements divided by that multiple (n). Additionally, a person skilled in the art will recognize that the rear axle side to side offset (the amount the rear axle is offset with respect to the frame centerline) on stock cars can also be measured using the vehicle alignment device 2 in a manner similar to those described above.

The degree of camber (the inward or outward tilt of a wheel from the vertical when viewed from the front of the wheel) can also be measured with vehicle alignment device 2. For this application, the vehicle alignment device 2 is not placed against tire 102. Instead the device is left free standing and used to generate a vertical plane of light. The mechanic measures the distance between at least two points defining a line that parallels the centerline of vehicle 100 and the vertical plane of light. Alignment device 2 is adjusted until the two measurements are equal causing the vertical plane of light to parallel the centerline of the vehicle. A mechanics ruler is used to measure the distance from the top center sidewall to the vertical plane and the distance between the bottom center sidewall to the vertical plane. The difference between the two measurements is one side of a triangle that defines the degree of camber and the difference between the points on the wheel that the two measurements were taken (approximately the size of the tire) is, a second side of the same triangle. The degree of camber can then be determined using geometry.

Additionally since housing 21 can be removed, it can be turned upside-down to generate a vertical plane of light in the opposite direction. Housing 21 can also be removed to generate a plane of light that can be used to align various objects. For example, housing 21 can be placed on end to generate a horizontal plane of light for setting electronic scales in the same plane, creating a reference line for placing letters and graphics on a vehicle, setting body panels, checking the rear tail clip on stock cars, etc.

In a preferred form of the invention, many of the components, such as lower base plate 12, upper slide plate 14, adjustable support legs 48 and 52, adjustment nut 54, handle 48, limit pins 46 housing 21, alignment bar 32, and various fasteners, are manufactured from aluminum, whereas plastics are used for some components, such as retention disc 38. However, any other material that is suitable for the design and use of the entire invention can be used. Preferably the materials selected should optimize durability, weight, and corrosion resistance of the final product while keeping the cost in mind.

While the description and drawings describe a preferred embodiment one having ordinary skill in the art will understand that numerous alterations in design can be made while still falling within the scope of the invention defined by the claims below. For example, the shape of many items, including upper slide plate 14, lower base plate 12, and slide plate limit holes 44, are not critical. Lower base plate 12 could be omitted and adjustable legs 48 and 52 could be slidably attached to upper slide plate by a mechanism similar to the one in FIG. 3. Adjustable legs 48 could be omitted in favor of a support base that can be leveled. A sliding mechanism different from the roller bearings could be provided. In fact beside coupling upper slide plate 14 and lower base plate 12, connector bolt 42, retention disc 38, retention disc washer 40, connector bolt nut 42, and opening 37, act in cooperation to allow both plates to slide relative to one another. As yet another alternative, one side of upper slide plate 14 can be used as an alignment surface and take the place of alignment bar 32. In another alternative, the light source can be fixedly coupled to the supports such that the light source cannot slide in any direction relative to the supports. Since this form of the invention does not have the self-aligning feature, the mechanic must align the device with the object he is measuring.

A preferred embodiment of the invention is sold under the tradename Laser String™ and manufactured by Advanced Racing Technologies of Stratsburg, N.Y.

What is claimed is:

1. Alignment system apparatus for measuring alignment of a component of a vehicle comprising:

a lower base plate;

an upper slide plate oriented parallel to the lower plate; a sliding mechanism coupled between the lower and upper plates and configured to allow the upper plate to slide in two dimensions parallel to the lower plate;

a light source mounting surface formed in the upper plate proximate a first outer edge, the mounting surface being inclined at a angle below the horizontal relative to the outer edge;

a light source removably coupled to the mounting surface on the upper slide plate and configured to generate a vertical plane of light when the light source mounting surface is level in a horizontal orientation;

an alignment bar coupled to the outer edge of the upper slide plate in an orientation parallel to the plane of light generated by the light source;

a level indicator coupled to the light source and providing an indication when the mounting surface is level in the horizontal orientation and the plane of light is in a vertical orientation;

a level adjuster coupled to the lower plate and operable to selectively raise or lower the plates to align the mounting surface level in the horizontal orientation and the plane of light in a vertical orientation, and causing the upper plate to slide relative to the lower plate in a direction from its center towards the outer edge until the alignment bar rests against and assumes the relative alignment of the component to be measured, and wherein the light source generates the vertical plane of light parallel to the alignment of the component to be measured.

2. The apparatus of claim 1 wherein the light source is a battery powered laser that generates a plane of light that is visible to the human eye when the light impinges upon an object.

3. The apparatus of claim 1 wherein the light source can be removed from the light source mounting surface and operated to provide a visible alignment plane.

4. The apparatus of claim 1 further comprising a slide-limit system that limits the distance that the upper plate can travel relative to the lower plate.

5. The apparatus of claim 4 wherein the slide-limit system comprises at least one hole formed in the upper plate equal in diameter to the desired limit of travel and a cooperating pin mounted on the lower plate and protruding though the hole formed in the upper plate.

6. The apparatus of claim 4 wherein the slide-limit system comprises at least one hole formed in the lower plate equal in diameter to the desired limit of travel and a cooperating pin mounted on the upper plate and protruding through the hole formed in the lower plate.

7. The apparatus of claim 1 further comprising a plurality of support legs coupled to and supporting the lower plate above a ground surface.

8. The apparatus of claim 7 wherein the upper and lower plates each have a triangular shape, wherein the outer edge of the upper plate comprises one length of the triangular shape, and wherein the lower plate includes a corresponding and similarly located outer edge.

9. The apparatus of claim 8 wherein one of the plurality of support legs is mounted proximate one of each of the three points of the triangularly shaped lower plate.

10. The apparatus of claim 9 wherein in the level adjuster comprises a mechanism that raises or lowers at least one of the plurality of support legs so that the plates are inclined at a downward angle towards the component to be aligned.

11. The apparatus of claim 10 wherein inclined downward angle of the plates causes the upper plate to slide toward the component to be measured until the alignment bar rests against and assumes the relative alignment of the component to be measured.

12. The apparatus of claim 11 further comprising a wheel to be measured, and the vertical plane of light generated when the alignment bar rests against and assumes the relative alignment of the wheel provides a reference line with respect to which wheel alignment measurements can be taken.

13. The apparatus of claim 1 wherein the light source is mounted to a support fixture, and the support fixture is removably coupled to the light support surface.

14. An alignment system for measuring alignment of a component of a vehicle comprising:

a lower base plate;

an upper slide plate oriented parallel to the lower plate;

a plurality of lower base plate supports coupled to and supporting the lower plate above a ground surface;

a sliding mechanism coupled between the lower and upper plates and configured to allow the upper plate to slide in two dimensions parallel to the lower plate;

a light source configured to generate a plane of light;

a light fixture including a receiver shaped to hold the light source so that the source generates a vertical plane of light when the fixture is aligned in a horizontal orientation;

a light fixture mounting surface formed in the upper plate at a position inboard of a first edge, the mounting surface being inclined at a downward angle from the first edge towards the center of the upper plate and configured to removably hold the laser fixture;

an alignment bar coupled to the light fixture in an orientation parallel to the plane of light generated by the light source;

an angle indicator coupled to the light fixture to indicate when the fixture is in a horizontal position; and an angle adjuster coupled to at least one of the lower base plate supports and configured to selectively raise or lower the angle of the lower and upper plates to align the light fixture as indicated by the angle indicator in the horizontal orientation and to cause the upper plate to slide relative to the lower plate in a direction towards the first edge until the alignment bar rests against and assumes the relative alignment of the component to be measured, and wherein the light source generates a vertical plane of light that extends over an extended vertical range and parallels the alignment of the component to be measured.

15. The alignment system of claim 14 further including a travel limit system cooperating with the lower and upper plates and configured to limit the distance in the two dimensions of allowed travel over which the upper plate can move relative to the lower plate.

16. The alignment system of claim 15 wherein the travel limit system comprises at least one guide circle formed in the body of a central portion of the upper plate; and at least one limit pin coupled to the lower plate and extending vertically through each of the at least one guide circle.

17. The alignment system of claim 14 wherein the receiver of the light fixture retains the light source in a configuration that generates the vertical plane of light outboard of the first edge of the upper plate.

18. The alignment system of claim 14 wherein the sliding mechanism coupled between the lower and upper plates comprises low friction bearings that allow the force of gravity to cause the upper plate to slide relative to the lower plate when the angle of the plates exceeds a horizontal orientation.

19. The alignment system of claim 14 wherein the alignment bar is coupled to the light fixture outboard of the light source receiver and the plane of light is generated in a plane between the first edge of the upper plate and the alignment bar.

20. The alignment system of claim 14 wherein the light source comprises a laser that generates a plane of light that is visible to the human eye when the light impinges upon an object.

21. A method of measuring alignment of a component of a vehicle comprising:

mounting a visible plane light source outboard of a first edge of an upper slide plate so that a vertical plane of light is generated when the first edge is aligned at an elevation below its opposing end;

mounting the first upper slide plate on a slide mechanism carried by a lower support plate;

supporting the lower support plate on a plurality of legs;

tilting the plates at an incline with a first edge of the lower plate positioned at an elevation below its opposing end so that a visible plane of light in a vertical orientation is generated by the visible plane light source;

allowing gravity and the tilted angle of the plates to cause the upper plate to move forward along the incline until an alignment bar coupled to the upper plate contacts and assumes the orientation of the component to be measured;

turning on the visible plane light source to generate the vertical plane of light;

using the vertical plane of light as a reference line for making measurements of the alignment of the component relative to another reference.

22. The method of claim 21 further comprising reading a level indicator coupled to the visible plane light source to provide an indication when the vertical plane of light is in the vertical orientation.

23. The method of claim 21 further comprising removing the light source from the upper slide plate and using it to create additional reference lines.

24. The method of claim 21 wherein the light source is a laser that generates a plane of light that is visible when it impinges upon an object.

25. The method of claim 21 wherein the plates are tilted by adjusting an effective length of a one of the plurality of legs.

* * * * *